Aug. 6, 1929.  T. W. DAHLLOF  1,723,014
LIQUID DISTRIBUTOR AND BEARING
Filed Dec. 26, 1925  2 Sheets-Sheet 1

INVENTOR
Ture W. Dahllof
BY Robert W Byerly
ATTORNEY

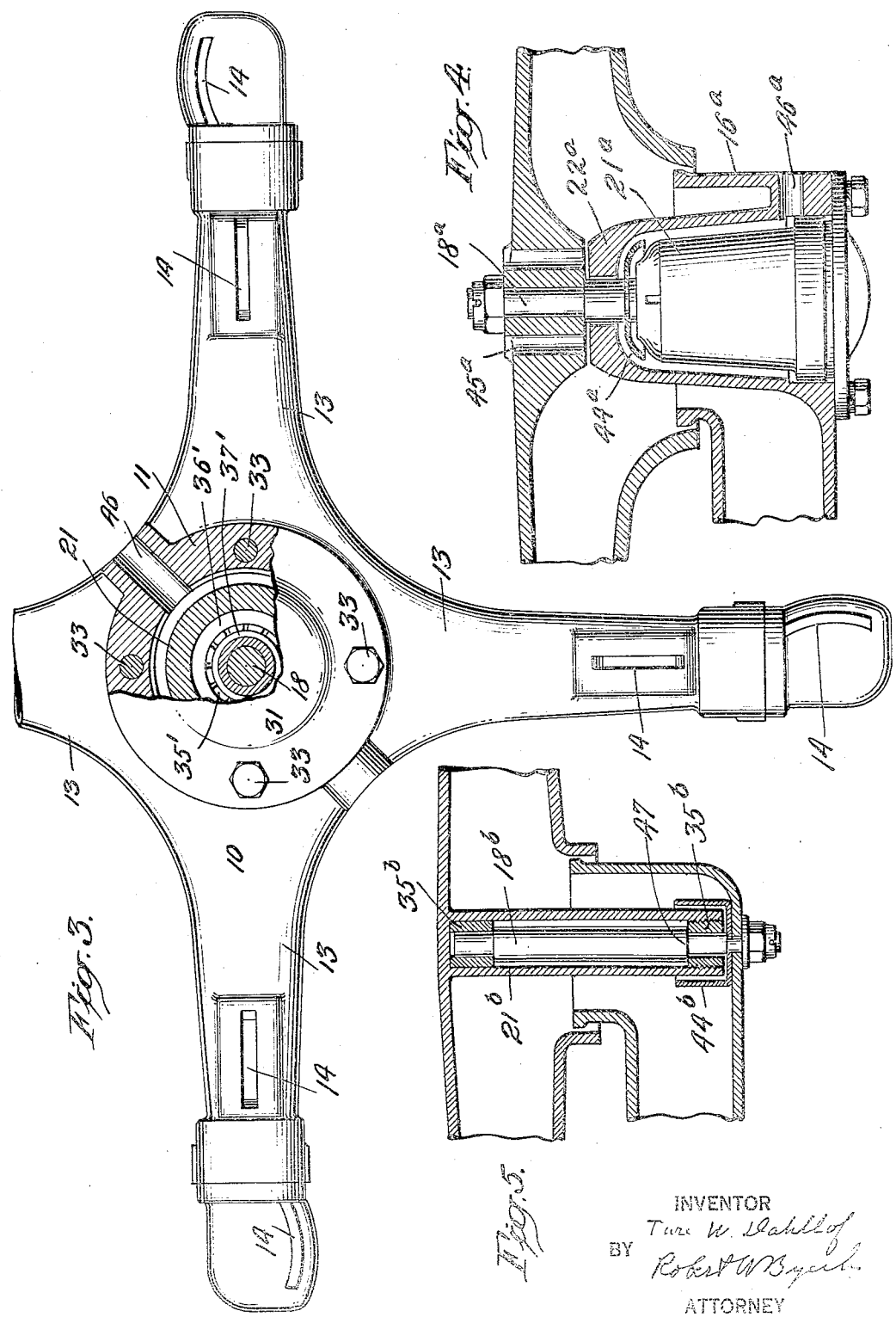

Patented Aug. 6, 1929.

1,723,014

UNITED STATES PATENT OFFICE.

TURE W. DAHLLOF, OF NEW ROCHELLE, NEW YORK, ASSIGNOR, BY MESNE ASSIGNMENTS, TO HOBART MANUFACTURING COMPANY, OF TROY, OHIO, A CORPORATION OF OHIO.

LIQUID DISTRIBUTOR AND BEARING.

Application filed December 26, 1925. Serial No. 77,897.

This invention relates to liquid distributors, and especially to an improved bearing for such distributors which may also be used to advantage for other purposes.

In certain patented washing machines it has been customary to provide rotary liquid distributors having axial intake openings communicating with the outlet openings of fixed conduits. Such distributors have been mounted on the conduits with which they communicate in various ways, for example, by means of a pin or shaft fixed in the conduit and extending through the distributor, as shown in Merseles and Bemm U. S. Patent No. 1,559,727, issued November 3, 1925. In such mountings, the cooperating bearing surfaces of the distributor and fixed parts on which it is mounted have been subjected to the action of the liquid passed through the distributor. In some cases the liquid, which is usually water or an aqueous solution, has been found to have a lubricating effect upon the bearing surfaces, while in other cases, and especially in machines for washing metal parts, the liquid contains chemicals or grit whose action on the bearing surfaces is highly deleterious. In no case is the lubricating action of the liquid distributed as satisfactory as that which would be obtained from a lubricant such as oil or grease.

Owing to the fact that any oil or grease escaping into the liquid to be distributed would have a deleterious effect on the washing and the further fact that the use of washing machines is ordinarily entrusted to operators who cannot be relied upon to apply lubricant at frequent intervals, it has heretofore been thought impracticable to provide a lubricated bearing in such distributors.

The invention provides a lubricated bearing which may be placed directly in a rotary wash water distributor or other liquid container having relatively rotatable parts, and used for long periods without attention. In accordance with the invention this result is obtained by surrounding the bearing with a casing and providing means which permanently retain lubricant therein and exclude the surrounding liquid therefrom.

Other features and advantages of the invention are hereinafter set forth in connection with a detailed description of specific liquid distributors containing bearings embodying the invention, which are illustrated in the accompanying drawings in which:—

Fig. 3 is a plan view of the distributor shown in Fig. 1, with parts broken away to show a partial section on the line 3—3 of Fig. 1;

Fig. 4 is a sectional elevation showing a modified distributor and mounting; and Fig. 5 is a partial sectional elevation showing another modified distributor and mounting.

Figure 1:
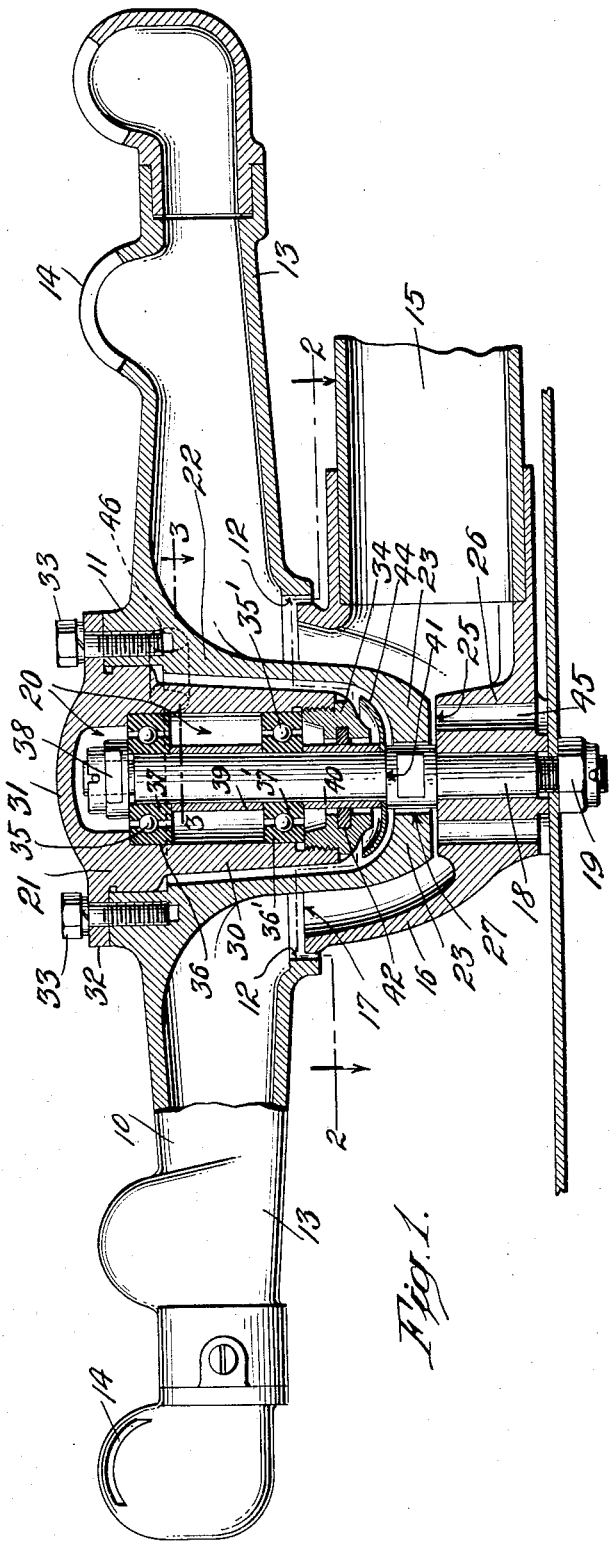
Fig. 1 is a sectional elevation of a distributor and its mounting.
Figure 2:
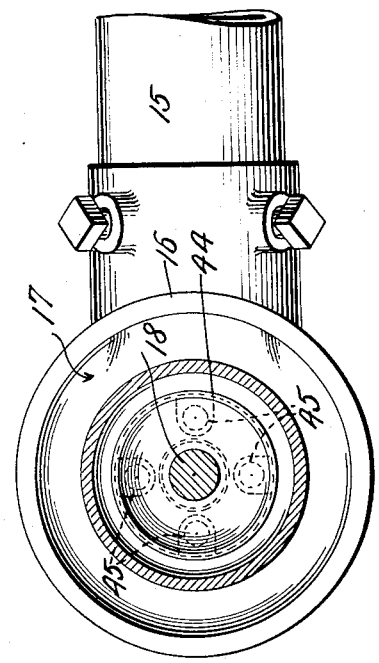
Fig. 2 is a horizontal section taken on the line 2—2 of Fig. 1.

The distributor shown in Figs. 1, 2 and 3 is adapted for use as either an upper or a lower distributor in a washing machine such as that shown in Merseles and Bemm Patent No. 1,559,727, and for other purposes. The distributor 10, like the usual distributors of this type, consists of a central or hub portion 11 and radial arms 13 preferably formed integral with the hub portion 11, as shown. The hub and arms form a conduit from the axial inlet opening 12 of the distributor, formed in one end of the hub, to discharge orifices 14 provided in the arms 13. Liquid is supplied to the distributor through a conduit 15 terminating in an elbow 16 having an outlet opening 17 communicating with the inlet opening 12 of the distributor. A shaft or pin 18 fixed in the elbow 16 projects out of the elbow and into the hub portion of the distributor through the communicating openings 17, 12.

The shaft 18 terminates within the distributor, which is rotatably mounted on it and held against axial movement by a bearing 20. This bearing is located in the hub of the distributor and is surrounded by an inner casing 21 and an outer casing 22, both of which are carried by the distributor.

The outer casing 22, as shown, is formed integral with the hub of the distributor 10. It extends inwardly from the closed end of the hub 11, extends through the length of the hub, and out through the intake opening 12 of the hub. The outer surface 23 of its outer end is located close to, but just out of contact with, the end surface 25 of an internal projection 26 in the elbow 16, in which one end of the shaft 18 is secured by a nut 19. A hole 27 is provided in the outer end 23 of the casing 22 for the passage of a shaft 18. A clearance is provided between the shaft and the periphery of this hole.

The inner casing 21 has the form of a cup. It consists of a sleeve 30 and a collar 34 screwed on the outer end of the sleeve. The inner end of the sleeve 30 is provided with a closure 31 and an external flange 32, which is secured to the hub 11 of the distributor by screws 33. The closure 31 of the inner casing 21 thus serves also as a closure for the inner end of the outer casing 22.

The bearing 20 serves to mount the cup 21—and consequently the entire distributor—rotatably upon the shaft 18. The bearing illustrated includes two sets of bearing balls 35, 35', having outer races 36, 36' in the cup 21 and inner races 37, 37' fixed on the portion of the shaft 18 which is within the cup. The inner races are held and positioned on the shaft by means of a nut 38, spacing sleeves 39 and 40 and a shoulder 41. The two sets of balls 35, 35' are far enough apart to prevent tipping of the distributor, while engagement between the balls and the grooves in their races prevents axial movement of the distributor.

The inner casing or cup 21 is filled with a lubricant such as oil or grease, and an important feature of the invention consists in providing means for retaining the lubricant in this casing both when the distributor is used as a lower distributor with the shaft 18 extending upwardly and when it is used as an upper distributor with the shaft 18 extending downward. The retention of the lubricant is accomplished by an arrangement which causes the pressure of the atmosphere or other external pressure to retain it within the casing 21. For this purpose, the casing 21 has at one end an air-tight closure 31, which is preferably formed integral with the walls of the casing, as shown, and its only opening at its other end, the small space between the collar 34 and the sleeve 40, is located in a horizontal plane. This horizontal opening is made as small as possible by a packing 42 seated in a groove in the collar 34. A dished flange or shallow cup 44 is fixed on the shaft 18 between the sleeve 40 and the shoulder 41. The flange 44 overlaps the outer edge of the collar 34 in a horizontal plane, so that when any lubricant leaks past the packing 40 and fills the cup flange 44 up to the level of the lower edge of the casing 21, a barometric seal is provided which prevents any further escape of lubricant from the inner casing 21 when the distributor is used as a lower distributor with the shaft 18 extending upward.

Another important feature of the invention consists in providing means for excluding from the bearing 20 the liquid which is passed through the distributor, both when the distributor is used as a lower distributor with the shaft 18 extending upward and when it is used as an upper distributor with the shaft 18 extending downward. It should be noted, however, that the arrangement already described for utilizing external pressure to retain the lubricant in the casing 21 is adapted also to exclude any other fluid from the casing, for such fluid cannot enter the inner casing without displacing the contents thereof and the arrangement described prevents such displacement. However, in order to eliminate all possible danger of any mixing between the lubricant and the liquid distributor, means are provided for maintaining a separating layer of air between them. Such means include the outer casing 22, which has been described, together with means for making it difficult for liquid to enter this casing and for immediately draining out any liquid which succeeds in entering. Such means include holes 45 extending through the wall of the elbow 16 from the clearance space between the surfaces 23 and 25. The combined cross-sectional area of the holes 45 is much greater than the cross-sectional area of this clearance space as well as that between the opening 27 and the shaft 18. Consequently, any liquid which starts to enter the casing 21 through these clearance spaces finds it easier to pass out through the openings 45, than to continue its travel through the clearance spaces. When the distributor is positioned with the shaft 18 extending upward, the passages 45 effectively divert all liquid from the casing 21. When the distributor is positioned with the shaft 18 extending downward, a little liquid may work into the casing 21 through the clearance spaces. Any such liquid strikes the flange 44, which diverts it away from the space between the collar 43 and the shaft so that it falls into the annular space between the inner and outer casings, from which it immediately escapes through drain passages 46, which extend out of this annular space through the wall of the distributor hub 11 between the arms 13. In order that liquid falling from the articles washed may not enter the casing 21 when the distributor is used as a lower distributor, the drain passages 46 are made horizontal.

It should be noted that the means for retaining the lubricant at the bearing 20 and excluding liquid passing through the distributor therefrom include no rubbing parts (other than the packing 42 whose friction against the sleeve 40 is negligible, particularly after the device has been in use for a time), and that a clearance is provided between the intake opening 12 of the distributor and the outlet end of the elbow 16. As a result, the only friction opposing rotation of the distributor is that of the lubricated balls 35, 35', which is, of course, very slight. The distributor may, therefore, be rotated rapidly and easily, either by the reaction of liquid discharged through its nozzles, or otherwise.

Notwithstanding the fact that the means for protecting the bearing produce no additional friction, they are so effective that the distributor may be used over long periods without giving any attention to its bearing. When after long use, for example, use for one or two years, it becomes necessary to renew the lubricant or to adjust the bearing, the bearing with the pin 18 and the inner casing 21 may be removed as a unit without disassembling for shipment to a shop or factory where the bearing may be lubricated and adjusted. To remove the bearing in this manner it is necessary merely to remove the nut 19 and the screws 33.

For cleaning, or other purposes, the distributor may be removed from the conduit by merely removing the nut 19 from the end of the shaft 18 so that the shaft may be withdrawn from the conduit. In such removal of the distributor, the bearing is not exposed, and so cannot be injured by careless handling.

Since the bearing lies entirely within the distributor and the conduit, the over-all height of a distributor provided with a new bearing is no greater than the over-all height of distributors previously used. As a result, the distributors of existing washing machines may be replaced by distributors provided with the new lubricated bearing without making any other change in the washing machine.

Fig. 4 shows a modification of the distributor and bearing shown in Figs. 1 to 3. In the arrangement shown in Fig. 4, the parts of the bearing are reversed. In this case the shaft $18^a$ is detachably fixed in the distributor while the inner and outer casings $21^a$, $22^a$ are fixed in the conduit. The parts within the inner casing $21^a$ are the same as those within the casing 21 shown in Fig. 1. The holes 45 in the wall of the conduit are replaced by holes $45^a$ in the wall of the distributor, while the drain passages 46 in the distributor are replaced by a drain passage $46^a$ extending from the space between the inner and outer casings through the end wall of the elbow $16^a$. The parts shown in Fig. 4 serve to retain lubricant in the inner casing and to exclude liquid therefrom both when the device is used as an upper distributor and when it is used as a lower distributor, when the device shown in Fig. 4 is used as an upper distributor, the flange $44^a$ provides a barometric seal for the inner casing and the operation is otherwise similar to that of the device shown in Fig. 1 used as a lower distributor. When the device shown in Fig. 4 is used as a lower distributor, flange $44^a$ serves as a deflector and the operation is otherwise similar to that of the device shown in Fig. 1 used as an upper distributor.

Fig. 5 shows a simplified embodiment of certain features of the invention, in which the outer casing is omitted. The ball bearings are replaced by plain bearings $35^b$, $35^{b'}$ between a pin or shaft $18^b$ fixed in the conduit and a sleeve $21^b$ extending from the closed end of the hub of the distributor. A collar $35^b$ forming part of the lower bearing engages a shoulder 47 on the pin to prevent axial movement of the distributor. The sleeve $21^b$ is filled with lubricant whose escape is prevented by the cup $44^b$ overlapping the edge of the sleeve. The barometric seal thus provided effectively retains the lubricant within the sleeve $21^b$ and excludes the fluid passed through the distributor therefrom both when the device is used as a lower distributor and the fluid contained in the conduit and distributor is lighter than the lubricant, and when the device is used as an upper distributor and the fluid in the conduit is heavier than the lubricant. In the converse cases, the lubricant is, of course, retained in the sleeve $21^b$ by gravity.

Claims to the distributors shown, originally contained in this application, have been eliminated in compliance with a requirement of the Patent Office, and are contained in my co-pending application, Serial No. 77,896, filed December 26, 1925.

What is claimed is:—

1. The combination with a rotary distributor having an axial intake opening and a fixed conduit having an outlet opening in communication with the inlet opening of the distributor, of a shaft fixed in one of said members, extending through their communicating openings and terminating within the other of said members, and a part fixed to said other member and surrounding the shaft and providing a centering and supporting bearing for the distributor holding it out of contact with the conduit.

2. The combination with a distributor having an axial intake opening and a fixed conduit having an outlet opening in communication with the inlet opening of the distributor, of a shaft fixed in the conduit extending into and terminating within the distributor, and a part rotatably mounted on said shaft and supporting and centering the distributor and holding it out of contact with the conduit.

3. The combination with a distributor having an axial intake opening and a fixed conduit having an outlet opening in communication with the inlet opening of the distributor, of a shaft fixed in one of said members and extending through their communicating openings and terminating within the other, a part fixed to said other member and rotatably mounted on said shaft, and means co-acting between said part and the shaft to prevent relative movement between said part and said shaft along the axis of the shaft in either direction.

4. The combination with a distributor having an axial intake opening and a fixed conduit having an outlet opening in communication with the inlet opening of the distributor, of a shaft fixed in the conduit and extending into and terminating within the distributor, means within the distributor engaging the shaft to prevent movement of the distributor along the axis of the shaft in either direction.

5. The combination of a conduit having an outlet opening, a shaft fixed in said conduit and extending through said outlet opening, a distributor having a hub closed at one end and open at the other, the open end of the hub communicating with the outlet opening of the distributor, and an axial sleeve closed at one end fixed to the hub and extending within the hub from the closed end thereof through the open end thereof and through the outlet opening of the conduit and rotatably mounted on the shaft.

6. The combination of a conduit having an outlet opening, a shaft fixed in said conduit and extending through said outlet opening, a distributor having a hub closed at one end and open at the other, the open end of the hub communicating with the outlet opening of the distributor, and an axial sleeve closed at one end fixed to the hub and extending within the hub from the closed end thereof through the open end thereof and through the outlet opening of the conduit and rotatably mounted on the shaft, and means for preventing relative axial movement of the shaft and sleeve.

7. The combination with a fixed conduit, of a distributor communicating therewith and rotatably mounted thereon by means of a bearing located within the confines of the distributor and conduit, and means for excluding from the bearing the liquid which is passed through the conduit and distributor.

8. The combination with a fixed conduit, of a liquid distributor communicating with the conduit, a bearing rotatably supporting the distributor and holding it out of contact with the conduit, a casing surrounding the bearing, and means for excluding from said casing the liquid which is passed through the conduit and distributor.

9. The combination with a fixed conduit, of a liquid distributor communicating with the conduit, a bearing rotatably supporting the distributor and holding it out of contact with the conduit, a lubricant-filled casing surrounding said bearing, and means for preventing lubricant from escaping from the casing.

10. The combination with a liquid distributor and a conduit communicating therewith, of a bearing rotatably supporting the distributor and holding it out of contact with the conduit, a casing surrounding said bearing, and means for retaining lubricant in said casing and excluding the liquid passed through the distributor therefrom both when the distributor is directed upwardly and when it is directed downwardly.

11. The combination of a rotary distributor and a conduit having communicating openings in their adjacent inner walls, an inward extension from the outer wall of one of said members separated by a narrow clearance space from the outer wall of the other member, and a shaft fixed in said other member on one side of said clearance space and extending through a hole in said extension on the other side of said clearance space.

12. A rotary distributor having a hub and radial arms extending therefrom, a bearing casing in the hub of the distributor, and means providing horizontal drain openings extending from the interior of said casing through the outer wall of the hub between the radial arms.

13. The combination with a distributor having an axial intake opening and a fixed conduit having an outlet opening in communication with the inlet opening of the distributor, of a shaft secured to one of said members, a bearing casing secured to the other of said members, and a bearing between said shaft and casing, the shaft and casing being removable in the same direction from the respective members to which they are secured so that the casing, shaft and bearing may be removed from the conduit and distributor as a unit.

14. A rotary liquid distributor having a hub containing an inlet opening at one of its ends, concentric casings extending from the inner surface of the other end of the hub toward the inlet opening of the hub and containing aligned openings in their ends.

15. A rotary liquid distributor having a hub containing an inlet opening in one of its ends, concentric casings extending from the inner surface of the other end of the hub projecting through the inlet opening of the hub and having aligned openings in their outer ends.

16. A rotary distributor having a hub containing openings of different diameter in its two ends, a circular wall formed integral with the hub extending inwardly from the periphery of the smaller opening and projecting through the larger opening, a sleeve closed at one end and having at its closed end an external flange, and means for securing said flange to the end of the hub surrounding the smaller opening so that the sleeve projects within said wall forming a double casing.

17. The combination with a bearing, of a lubricant-filled casing surrounding the bearing, and means for utilizing the pressure of the atmosphere to retain the lubricant in said casing.

18. The combination with a bearing and a lubricant-filled casing therefor, of means providing a barometric seal for retaining lubricant in said casing.

19. A barometrically sealed casing for a bearing between two relatively rotatable members, comprising an inverted lubricant filled inner cup carried by one member, and an outer cup carried by the other member, overlapping the lower edge of the inner cup in a horizontal plane, and filled with lubricant up to the lower edge of the inner cup, so that atmospheric or other external pressure upon the surface of the lubricant in the outer cup retains the lubricant in the inner cup.

20. A barometrically sealed casing for a bearing between a fixed member and a rotatable member, comprising a lubricant-filled inverted inner cup carried by the rotatable member, and an outer cup carried by the fixed member and overlapping the inverted cup in a horizontal plane, and filled with lubricant up to the lower edge of the inner cup, so that atmospheric or other external pressure on the surface of the lubricant in the outer cup retains the lubricant in the inner cup.

21. A bearing structure comprising a solid vertical shaft, an inverted cup enclosing the upper end of said shaft and rotatably mounted thereon, and a cup-flange fixed on said shaft extending outside of and overlapping the lower edges of the inverted cup.

22. An invertible bearing structure, comprising a wall having liquid on one side thereof and containing an opening, a shaft extending through said opening, a cup surrounding the outer end of the shaft and rotatably mounted thereon, a flange fixed on the shaft outside the wall and overlapping the end of the cup so as to form a barometric seal for lubricant within the cup when the shaft is directed upwardly and to deflect liquid passing through said opening away from the cup when the shaft is directed downwardly.

23. The combination with a liquid container, of a vertical shaft located therein, a casing located within the container, surrounding the upper end of the shaft, having a closed upper end and a lower end containing a hole for the passage of the shaft, a bearing for the shaft located within the casing, and a fluid in the casing having a specific gravity less than that of the liquid in the container, so as to exclude said liquid from contact with said bearing.

24. The combination with inner and outer concentric relatively rotatable members, and a submerged bearing between said members, of a casing surrounding the bearing and the outer member, and means for draining off liquid leaking into said casing.

25. The combination with a liquid container, concentric relatively rotatable inner and outer members, and a bearing between said members located in the container, of a casing surrounding the bearing and the outer member, and means providing a drain passage extending from the interior of said casing through a wall of said container.

26. The combination with a container and a shaft within the container, of a bearing for the shaft located within the container, a casing surrounding said bearing and containing an opening for the passage of the shaft, and means providing a drain passage extending from the interior of said casing through a wall of the container.

27. The combination with two relatively rotatable communicating conduits, of a shaft fixed in one of the conduits and extending into the second conduit, a casing fixed in the second conduit surrounding the end portion of the shaft and containing an opening for the passage of the shaft, a bearing within said casing, means for diverting the liquid passed through the conduits from the opening in said casing when the shaft is directed upwardly, and means for draining out the liquid entering said casing when the shaft is directed downwardly.

28. The combination with a submerged bearing, of inner and outer casings surrounding said bearing, means for retaining lubricant in the inner casing, and means for draining off any liquid entering the space between the casings.

29. The combination with a conduit and a bearing therein, of an inner casing surrounding the bearing, an outer casing surrounding the inner casing, means for retaining lubricant within the inner casing, and means providing a drain passage extending from the space between the two casings through the outer wall of the conduit.

30. The combination with a conduit and a shaft terminating therein, of a casing fixed in the conduit surrounding a part of the shaft and containing an opening for the passage of the shaft, a bearing between said casing and the shaft, means for preventing the escape of lubricant through said opening, an outer casing surrounding the inner casing and containing an opening for the passage of the shaft, and means providing drain passages extending from the space between the two casings through the outer wall of the conduit.

31. The combination with two relatively rotatable communicating conduits, of a shaft fixed in one conduit and extending into the second conduit, an inner casing fixed in the second conduit and surrounding a part of said shaft, a bearing between said shaft and casing, and an outer casing fixed in the second conduit enclosing said inner casing and having an end surface spaced from a wall of the first conduit to provide a narrow clearance space between them, the walls of the conduits containing drain openings extending from said clearance space and from the space between the two casings.

32. The combination with two relatively rotatable communicating conduits, of concentric casings extending inwardly from an outer wall of one of the conduits and having aligned openings in their ends, a shaft fixed in the other conduit and extending into the inner casing through the aligned openings in the ends of the casings, a bearing between the shaft and the inner casing, and a cup-shaped flange fixed on the shaft between the inner and outer casings and overlapping the end of the inner casing.

33. The combination with a conduit and a bearing therein, of a bearing casing surrounding the bearing and consisting of two relatively rotatable parts separated by a clearance space, and a drain passage of greater cross-section than that of the clearance space leading from one wall of the clearance space through an outer wall of the conduit.

34. The combination with two relatively rotatable communicating conduits, of a bearing casing located within the conduits and consisting of parts secured to the two conduits respectively and separated by a clearance space, and drain openings of greater cross-section than that of the clearance space leading from one wall of the clearance space through an outer wall of one of the conduits.

In testimony whereof I have hereunto set my hand.

TURE W. DAHLLOF.